(12) United States Patent
Ko et al.

(10) Patent No.: US 6,292,185 B1
(45) Date of Patent: *Sep. 18, 2001

(54) METHOD AND APPARATUS FOR TAILORING THE APPEARANCE OF A GRAPHICAL USER INTERFACE

(75) Inventors: Bong Su Ko; Jae Hyun Kim; Seok Ho Youn, all of Seoul (KR)

(73) Assignee: C.C.R., Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,046

(22) Filed: Apr. 27, 1998

(51) Int. Cl.[7] .................................................. G06F 13/00
(52) U.S. Cl. ............................................. 345/334; 345/342
(58) Field of Search ................................. 345/333, 327, 345/356–357, 334–335, 336, 340–349, 326, 328–330; 707/502, 513, 517

(56) References Cited

U.S. PATENT DOCUMENTS

| | | | |
|---|---|---|---|
| 5,793,966 | * | 8/1998 | Amstein et al. ................. 395/200.33 |
| 5,802,530 | * | 9/1998 | Van Hoff .............................. 707/513 |
| 5,818,446 | * | 10/1998 | Bertram et al. ....................... 345/334 |
| 5,845,299 | * | 12/1998 | Arora et al. .......................... 707/513 |
| 5,875,332 | * | 2/1999 | Wang et al. .......................... 395/702 |
| 5,892,905 | * | 4/1999 | Brandt et al ..................... 395/187.01 |
| 6,014,638 | * | 1/2000 | Burge et al. ........................... 705/27 |
| 6,020,885 | * | 2/2000 | Honda ................................... 345/332 |

OTHER PUBLICATIONS

Hong, Dok Hee, "First Show of Made–to–order Browser that Allows for Wide Range of Designs", Hankook Ilbo, Apr. 27, 1997, p. 32 (translation from Korean to English) (Korean language version).

* cited by examiner

*Primary Examiner*—Steven Sax
(74) *Attorney, Agent, or Firm*—Skjerven Morrill MacPherson LLP; Edward C. Kwok, Esq.

(57) ABSTRACT

A method and apparatus for tailoring the appearance of a graphical user interface, specifically an internet web browser. A host server receives a request over the internet or an intranet for a web page. The host server provides the necessary data and executable files for the user's personal computer. A computer program executed on a personal computer alters the appearance of a user's graphical web browser by accessing data files. The appearance of a web browser can be tailored using an editor program to provide data files used to tailor the appearance of a web browser.

12 Claims, 6 Drawing Sheets

METHOD AND APPARATUS FOR TAILORING THE APPEARANCE OF A GRAPHICAL USER INTERFACE

CROSS REFERENCE TO APPENDIX INCLUDING COMPUTER PROGRAM LISTINGS

Appendices A–G, which are integral parts of the present disclosure, include a listing of a computer program and its related data in one embodiment of this invention. This computer program listing contains copyrighted material. The copyright owner, C.C.R. Inc., which is also the Assignee of the present patent application, has no objection to the facsimile reproduction by anyone of the patent document or the present disclosure, as it appears in the Patent and Trademark Office patent files or records, but otherwise reserves all copyrights whatsoever.

BACKGROUND

1. Field of the Invention

The present invention relates to a method and apparatus for tailoring a graphical user interface.

2. Discussion of Related Art

A personal computer user with access to the internet can use a web browser such as Microsoft Internet Explorer or Netscape Navigator to access the server of a web page with graphical content. To specify a web site, the user enters a universal resource locator (URL) specifying both the server and the specific data ("web page") requested. The URL may specify a hyper-text transfer protocol (HTTP) or another transfer protocol for communicating between the server and the browser. In the internet, the URL is transmitted to the host server which stores information corresponding to the URL.

Subsequent to receipt of a request for the contents of a URL location, the host server provides the web page in the hyper-text markup language (HTML) format which includes specific processing instructions to the browser. The web page may include video or audio streams in addition to graphics and text. However, the browser displays the contents of the web pages thus far inside the display window. By limiting customization of a web page to only the contents of a window, a web page designer is limited in his or her freedom to communicate with viewers. Thus what is needed is a way for a web page designer to customize the appearance of a graphical web page free of the limits imposed by the browser.

SUMMARY OF THE INVENTION

The first embodiment of the present invention includes a method for tailoring the appearance of a graphical user interface including the steps of (1) identifying a graphical user interface whose appearance is to be tailored; (2) providing data of the appearance and controls of the graphical user interface; and (3) tailoring the graphical user interface in accordance with the data. The graphical interface includes a graphical web browser.

The first embodiment of the present invention further includes an apparatus for tailoring the appearance of a graphical user interface which includes (1) logic that identifies a graphical user interface whose appearance is to be tailored; (2) logic that provides data of the appearance and controls of the graphical user interface; and (3) logic that tailors the graphical user interface in accordance with the data. The graphical interface includes a graphical web browser.

The first embodiment of the present invention further includes a method for transmitting a computer program that tailors the appearance of a graphical user interface including the steps of (1) receiving a request for a computer program representing information displayed among the graphical user interface; and (2) supplying the requested computer program, wherein the computer program further includes a computer program for tailoring the shape of the graphical interface. The graphical interface including a web browser.

The first embodiment of the present invention further includes an apparatus for transmitting a computer program that tailors the appearance of a graphical user interface that includes logic that receives a request for a computer program representing information displayed among the graphical user interface; and logic that supplies the requested computer program, wherein the computer program further includes a computer program for tailoring the shape of the graphical interface. The graphical interface including a web browser.

The first embodiment of the present invention further includes a computer program embodied on a computer-readable medium for altering the appearance and controls of a graphical user interface including code segments that identifies a graphical user interface whose appearance is to be tailored; provides data of the appearance and controls of the graphical user interface; and tailors the graphical user interface in accordance with the data. The graphical interface including a web browser.

The second embodiment of the present invention further includes a method for providing information specifying the appearance of a tailored graphical user interface including the steps of (1) providing a background image of said graphical user interface; (2) providing the image and location of graphical user interface controls; (3) providing a region for data to be displayed within the graphical user interface; and (4) providing said information which specifies the background image, the location and appearance of the controls and the region in which data is to be displayed within the graphical user interface. The graphical interface including a web browser.

The second embodiment of the present invention further includes an apparatus for providing information specifying the appearance of a tailored graphical user interface including logic for providing a background image of the graphical user interface; logic for providing the image and location of graphical user interface controls; and logic for providing a location for data to be displayed within the graphical user interface; and logic for providing the information which specifies the background image, the location and appearance of the controls and the region in which data is to be displayed within the graphical user interface. The graphical interface including a web browser.

The second embodiment of the present invention further includes a computer program embodied on a computer-readable medium for allowing a user to provide information specifying the appearance of a graphical user interface including a code segment that provides the information which specifies a user selected background image, a user selected appearance and location of the controls and a user selected region in which data is to be displayed within the graphical user interface. The graphical interface including a web browser.

The present invention is better understood in view of the detailed description below and the accompanying drawings.

DETAILED DESCRIPTION

A first embodiment of the present invention allows a personal computer user to "surf the internet" using a web browser which displays graphics (hereafter "web browser") and that processes Microsoft ActiveX controls, such as Microsoft Internet Explorer 4.0 or Netscape Navigator 3.0 with "ScriptActive" plug-in from N Compass Labs.

Figure 1:
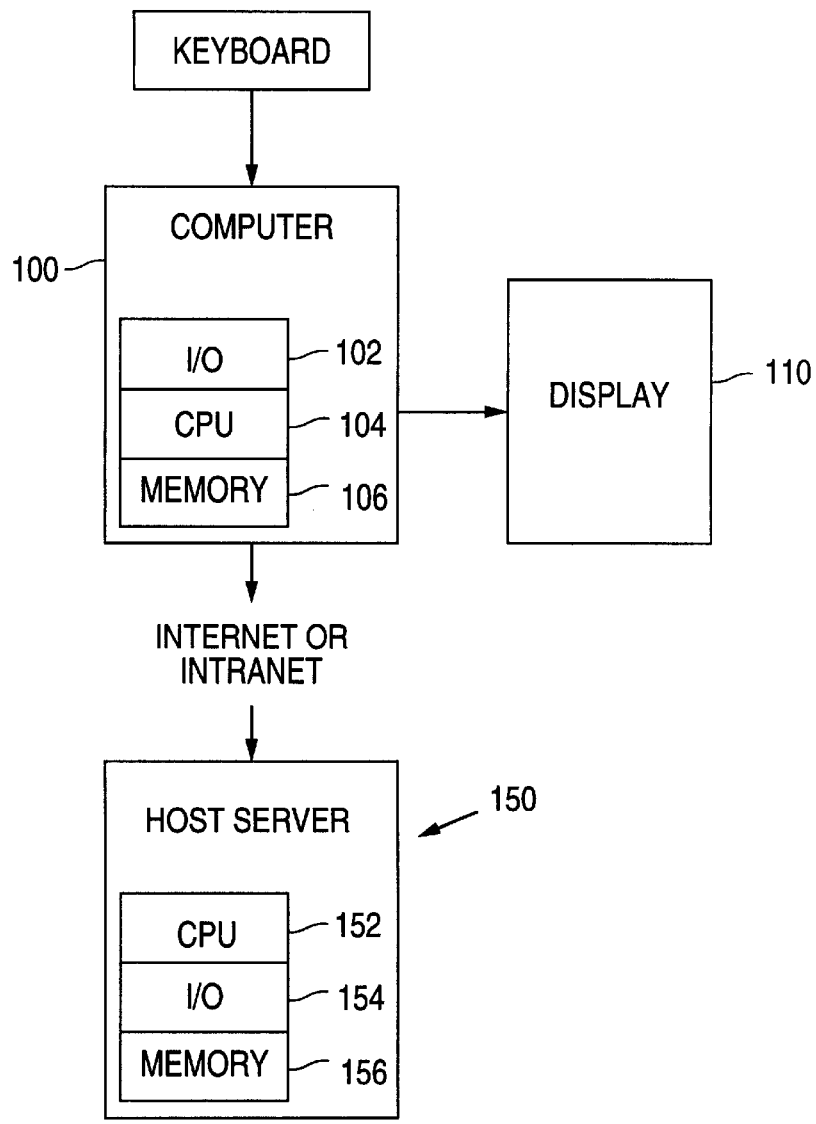
FIG. 1 depicts a computer system connected to a host server for implementation of one embodiment of the present invention.

FIG. 1 depicts a block diagram of a personal computer 100 such as a commercially available IBM PS/2personal computer, Apple Macintosh computer, or UNIX-based workstation. Display 110 can be a computer monitor such as a super VGA type or other visual display device. In particular, FIG. 1 illustrates a hardware configuration of a typical personal computer 100 having an input/output adapter 102, central processing unit 104 (e.g., a microprocessor), and a memory 106. The personal computer 100 can connect to host server 150 through an intranet or internet or other communications channels. Similarly, the host server 150 includes an input/output adapter 152, central processing unit 154, such as a microprocessor, and a memory 156. In this embodiment host server 150 can be, for example, any of various systems available from SUN Microsystems running Microsoft NT 4.0, Microsoft Internet Information Server (IIS), or UNIX operating system. In this embodiment, host server 150 uses hyper-text transfer protocol (HTTP) for communicating data over the internet or an intranet for example, although communication may be through other techniques.

Personal computer 100 typically has resident thereon an operating system such as the Microsoft Windows NT™ or the Microsoft Windows 95™ Operating System (OS), the IBM OS/2, the Apple MAC OS, or the UNIX OS such as the HP-UX OS. Those skilled in the art will appreciate that the present invention may also be implemented on platforms and operating systems other than those mentioned above.

The user provides a web page URL for a requested web page. When viewing the web page ("customized web page"), the web browser appearance is to be customized ("customized web browser") in accordance with one embodiment of the present invention. A customized web site typically hosts multiple linked customized web pages. A host server, which hosts the customized web site, provides the web pages in hyper text markup language (HTML) for example.

The functions of host server 150 include responding to requests for data, transmitting data, and providing a proper version of necessary customized files which allow customized web browsers to be constructed. In this embodiment, host server 150 software, x2adminn.cpp, is written in Visual C++ 5.0 and operates on Microsoft NT 4.0 and IIS operating systems and UNIX operating system. An example of host server 150 software is provided in Appendix A. Other functions of host server 150 or its software may include monitoring the number of accesses of a customized web site, or receiving and processing financial transactions from customized web sites.

Host server 150 maintains files of the customized web site which include a configuration file (config.xtl), web page code (default.htm), customizer installation files (x2inst.cab, x2inst.inf), customizer operation files (x2client.exe), web browser customization data files (default.xtc, default.xtd, edge.pol, back.bmp, main.bmp, etc.). An example of a configuration file is provided in Appendix E. An example of web page code is provided in Appendix F, written in HTML with Visual Basic Scripting. Examples of customizer installation files are included in Appendix B. Example of customizer operation files are included in Appendix C. Appendix C includes files, written in Visual C++ 5.0, when compiled make up file x2client.exe.

Figure 2:
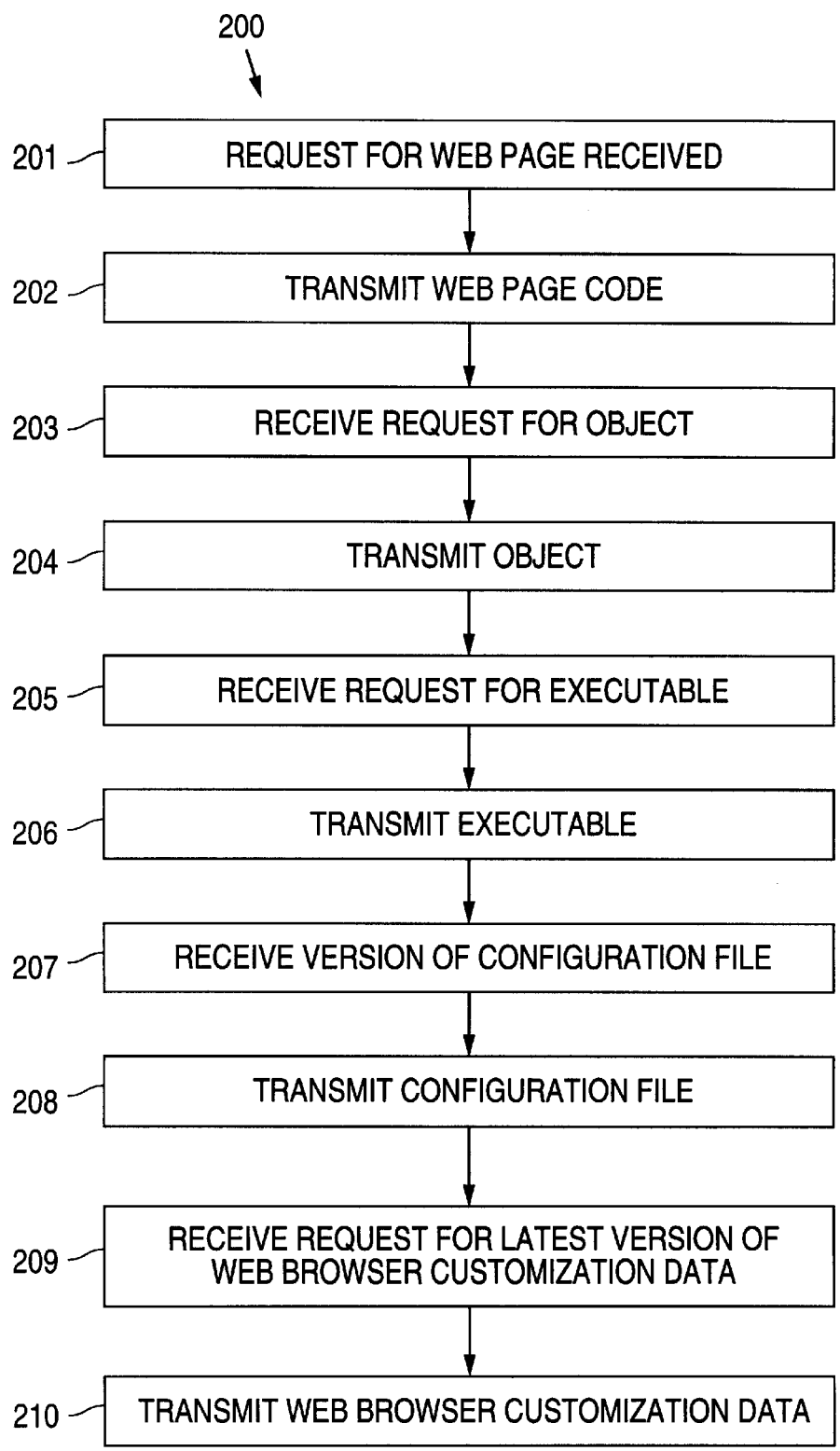
FIG. 2 depicts a flow chart diagram 200 of a sample operation of host server 150 of FIG. 1.

FIG. 2 depicts a sample operation of host server 150. In step 201, host server 150 receives a request for access to a customized web page. In step 202, the server transmits the web page code, (i.e., the program default.htm) to the user's personal computer 100. Thereafter host server 150 awaits any further requests from the user. In step 203, a request to download an object x2Installer1 is received. In step 204, the requested object is transmitted. In step 205, a request to download an executable program x2client is received. In step 206, the requested executable program is transmitted to the user's personal computer 100. In step 207, a request is received for the latest version of a configuration file. In step 208, the latest version of the requested configuration file is transmitted to the user's personal computer 100. In step 209, a request is received for the latest version of web browser customization data. In step 210, the customization data is transmitted to the user's personal computer 100.

Figure 3:
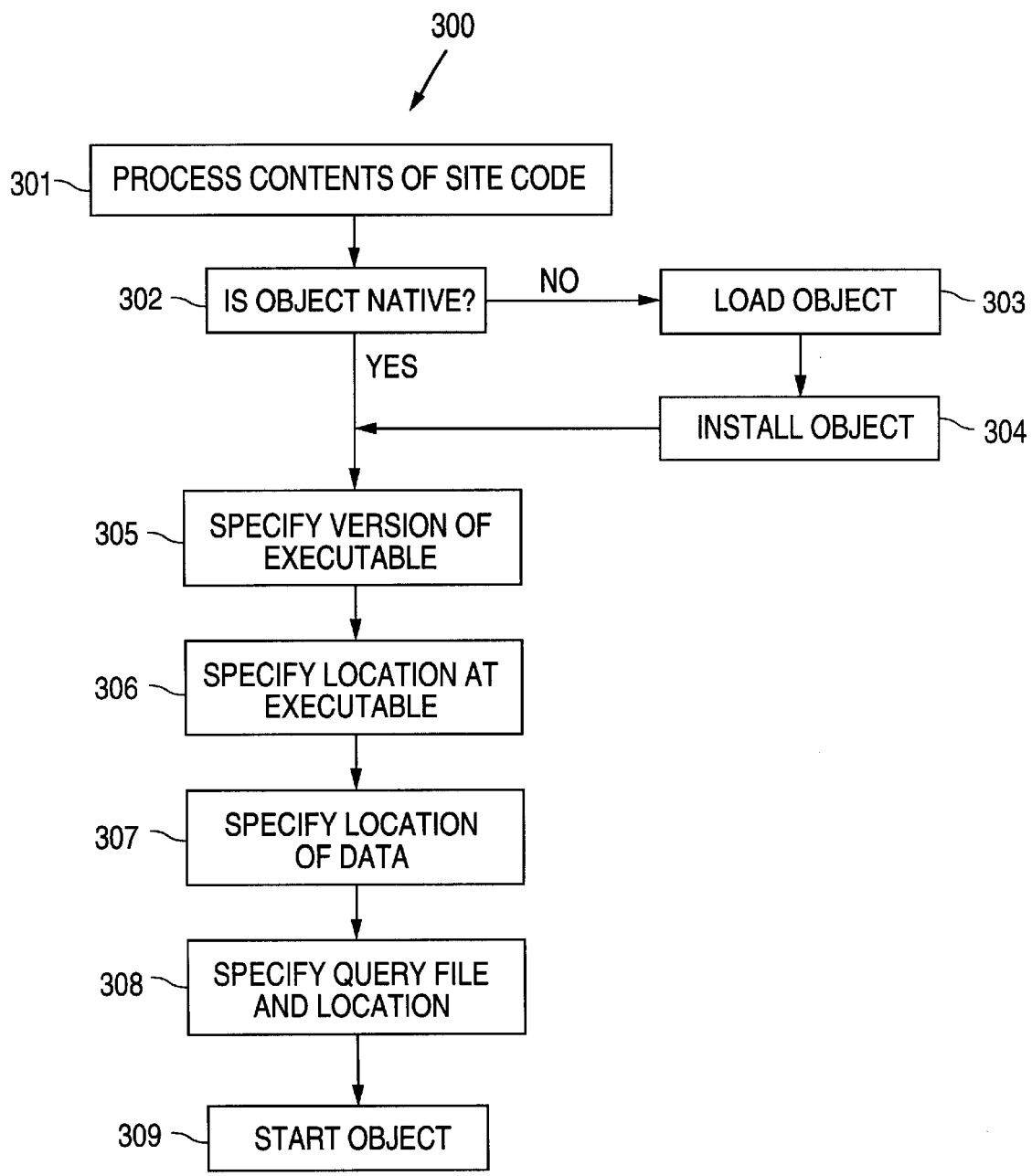
FIG. 3 depicts a flow chart diagram 300 of the operation of web page code for a customized web browser which is an embodiment of the present invention.

FIG. 3 depicts the operation of the web browser upon receiving the sample web page code (i.e., file default.htm). In this embodiment the web page code is processed on the user's personal computer 100 although it may be processed on the host server. In step 301 the user's personal computer 100 processes the web page code, (i.e., program default.htm). Program default.htm of Appendix F includes instructions in HTML as well as in Microsoft Visual Basic Scripting. The program references an ActiveX object "x2Installer1". In step 302, the user's personal computer 100 determines whether the ActiveX object, "x2Installer1" is "native" to the user's personal computer 100. Native means that the identification code of the object, specified by statement CLASSID, is recognized by and installed among the user's operating system or browser if native, step 205 follows. If not native, in step 303, the user's personal computer 100 is commanded by directive CODEBASE in the program default.htm to download a file named "x2inst.cab" from the URL "http:// host$_{13}$ server__address/cab/". Once downloaded, in step 304, file "x2inst.cab" is decompressed and installed as "x2inst.dll" on the user's personal computer 100 File x2inst.dll is installed according to the parameters of file x2inst.inf (Appendix B), which is provided with "x2inst.cab".

In file x2inst.inf, directive "file-winx86=thiscab" causes the installation of file x2inst.dll, included within the file "x2inst.cab", and specifies that the file runs on Microsoft Windows and is for use with x86 computers. Other files, msvcrt.dll and cabinet.dll, provided with Microsoft Windows 95, assist in installation. The ActiveX object "x2Installer1" is thereafter recognized by the user's operating system or web browser when identified by the CLASSID statement.

FIG. 3 further depicts operation of Microsoft Visual Basic Script commands included with program default.htm. Microsoft Visual Basic script are executed following event "OnLoad" (i.e., upon loading program default.htm). In step 305, statement "x2Installer1.version=10" of program default.htm specifies the version of program x2client.exe, the program which alters the user's web browser, included in Appendix C. In step 306, statement "x2Installer1.DownloadLocation=http://host_server_address/install/" specifies the location of the desired version of x2client.exe. In step 307, statement "x2Installer1.ServerLocation="host_server_address/cola" specifies the location of data for use by x2client.exe. In step 308, statement "x2Installer1.QueryServer=/x2web/x2query.dll" specifies that file named x2query.dll is located in directory x2web on the host server. The functions of file x2query.dll include managing the version of configuration file config.xtl, described in more detail below. In this embodiment, file x2query.dll has been written for Microsoft IIS server operating system and is provided in Appendix A. Directive "call x2Installer1.Startx2Web( )" instructs the user's personal computer 100 to commence operation of object x2Installer1, at step 309.

Figure 4:
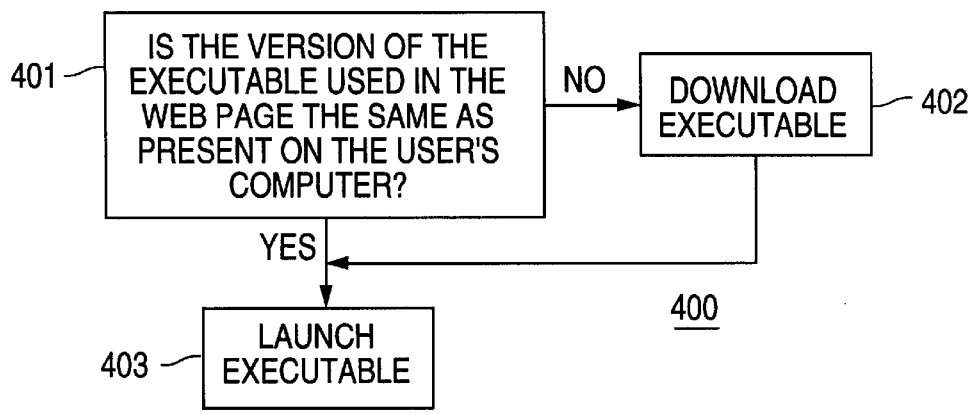
FIG. 4 depicts a flow chart diagram 400 of the object x2Installer1 which is an embodiment of the present invention.

FIG. 4 depicts operation of object x2Installer1. Object x2Installer1 calls on routines in dynamically linked library file x2inst.dll. In step 401, object x2Installer1 checks if the version of the executable program used for the customized web page, specified in step 305 of FIG. 3, is the same as that installed on the user's personal computer 100. If the version is not the same or the executable is not present on the user's personal computer 100 then in step 402, the executable program, so packaged in x2client.cab, is next downloaded from the location specified in step 306 of FIG. 3. File x2client.cab is expanded to file x2client.exe. and file x2client.exe installed on the user's personal computer 100. After x2client.exe is installed, by directive ShellExecute, x2client.exe is launched in step 403.

Figure 5:
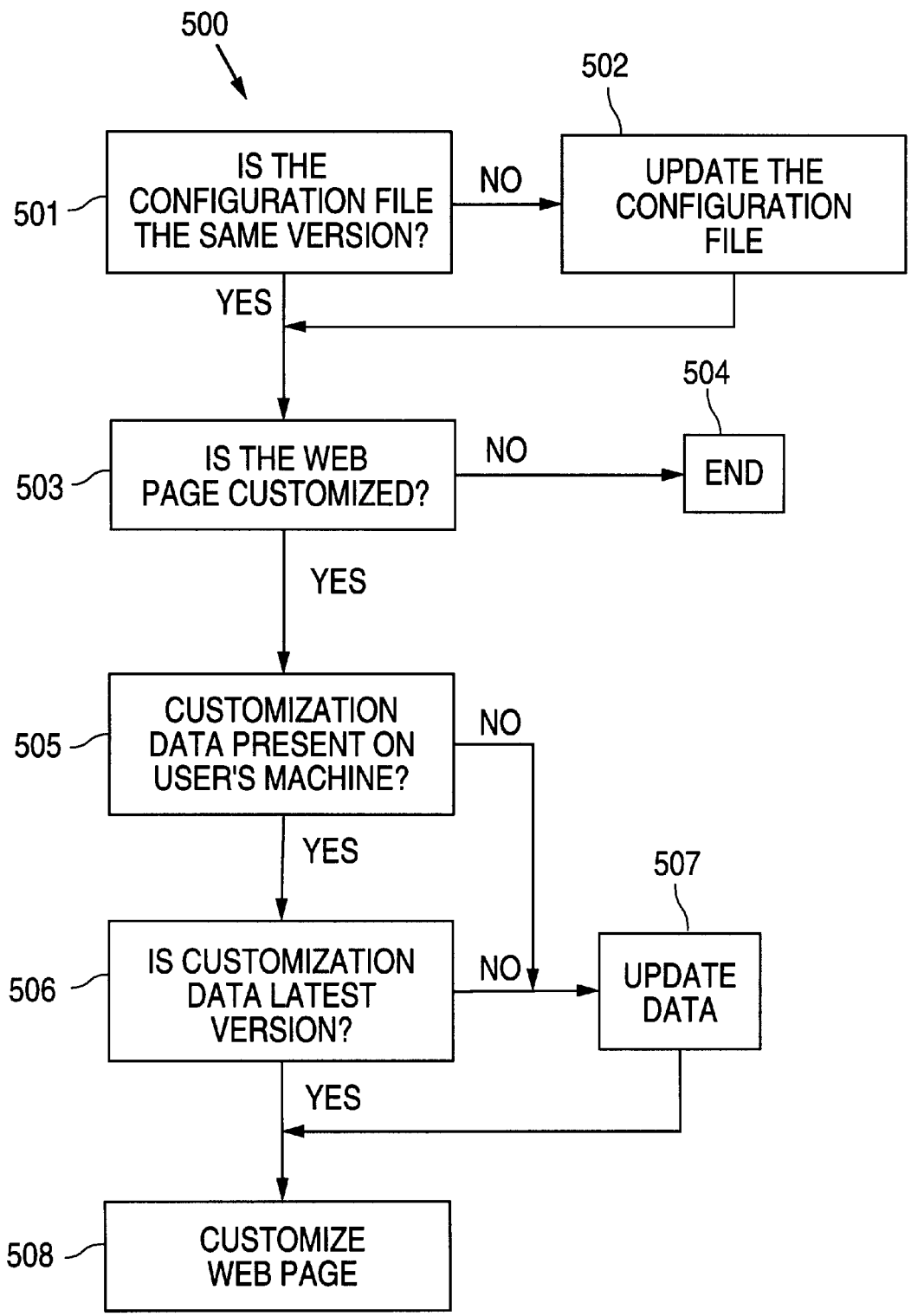
FIG. 5 depicts a flow chart diagram 500 of the program, x2client.exe, which is an embodiment of the present invention.

FIG. 5 depicts an example of the steps of program x2client.exe. In step 501, the user's personal computer 100 checks if the version of the configuration file, config.xtl, stored on the user's personal computer 100 is the same as that available from host server 150. Directive "http://host_server_address/x2query.dll?Get&XTLVersion" specifies that a check is to be performed of the version of config.xtl maintained by host server 150. Host server 150 calls routines in the dynamically linked library file x2query.dll. File x2query.dll manages a communication with the user's personal computer 100 to determine if an update of file config.xtl needs to be performed. The version of file config.xtl is provided to host server 150. If host server 150 returns a value of 0, then no update of the file config.xtl stored on the user's personal computer 100 need be performed and step 503 follows. If a return value of 1 is transmitted by host server 150 then in step 502, a new version is downloaded. File config.xtl includes a list of all the customized web sites stored by the host server. A sample of file config.xtl is provided in Appendix E.

In file config.xtl statement "VERSION=18" specifies the version of the configuration file. Statement "NUMBER=1" specifies that there is only one customized web page on host server 150. Other customized web page can be added. For each customized web page, file config.xtl includes accessible directories, associated customizing data files, and the number of customized web pages linked to the web page accessed. For example statement "DIR=/COLA/" specifies a directory on host server 150 that includes a customized web page. Statement "NAME=DEFAULT" specifies the name of customizing data file, default.xtd. File default.xtd specifies the screen coordinates in which the decoded HTML is to be displayed and includes image files used in the display of customized web browser. Statement "size=3" specifies the number of pages that are linked to the customized web page accessed.

In step 503, it is determined whether the accessed web page is customized. If a directory corresponding to the accessed web page does not appear in config.xtl then the process ends, step 504. However, the programmer can alter the process so that if a directory corresponding to the accessed web page does not appear in config.xtl the next step is step 501. The file config.xtl acts as a way for a programmer to control what web pages can be customized. If a directory corresponding to the present web page is included in file config.xtl, then in step 505 it is determined whether there is web browser customization data stored on the user's personal computer 100. If stored, step 506 follows, otherwise step 507 follows.

In step 506, it is determined whether the web browser customization data stored in the user's personal computer 100 is the latest version. If the web browser customization data is not stored on the user's personal computer 100 or is not the latest version then in step 507, the latest version of the data is downloaded from host server 150. In step 508, the web browser is customized in accordance with the web browser customization data.

Figure 6:
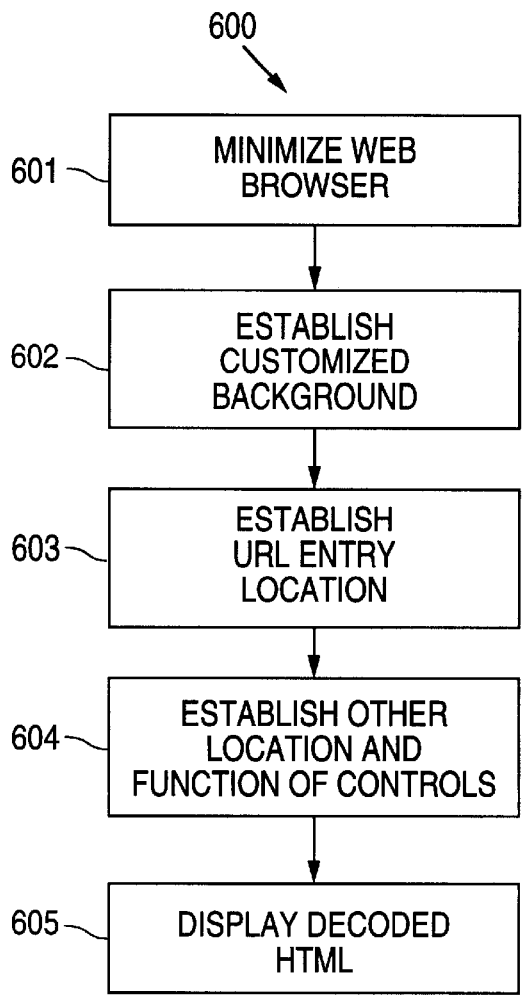
FIG. 6 depicts a flow chart diagram 600 depicting the process of customizing a web browser in accordance with the first embodiment of the present invention.

FIG. 6 operations of step 508 of FIG. 5 in more detail. Executable x2client.exe accesses web browser customization data files default.xtc (Appendix G), default.xtd, edge.pol. File default.xtd includes compressed graphics files used in the display of a customized web browser. In this embodiment, these graphics files can be produced by an editing tool program described in more detail below with respect to a second embodiment. In step 601 the user's web browser is minimized on the user's display 110 (FIG. 1) while still maintaining the connection with the location specified by the URL and allowing use of the functions of the web browser. Minimization in the Windows operating system means that the web browser is active but represented on the display 110 as an icon. In step 602, file default.xtc is accessed. In file default.xtc, directive "BACKGROUND=Main.bmp" specifies that the customized web browser uses as background an image stored in file Main.bmp. For example, file Main.bmp includes a red can shape. Statements X=0, Y=0, CX=640, and CY=655 provide that the background image originates at screen location (0,0) and terminates at (640, 655). Statement "EDGETYPE=POLYGON" indicates the type of file where the edge line of the image in Main.bmp is located. Statement "EDGE=edge.pol" specifies the name of the edge line file. The edge line represents the outside boundary of the background image, Main.bmp. In step 603, directive URLEDITLOCATION specifies the (X,Y) pixel location on the display 110 of a position for placing a graphical area which allows display and editing of a URL address entry. In step 604, customized control buttons are positioned. Directive BTNNUMBER=5 indicates the number of control buttons. For example, for a "go to the previous page" (back) button, statement LOCATION specifies the screen location of the button. Statement BMP specifies the name of the file containing the image of the back button. Directive FUNCTION=Back specifies the function of the button. Thus an image stored as file back.bmp appear between corners with screen coordinates (740, 91) and (806, 125). The locations and functions of a forward, refresh, stop, and home buttons are also provided. In step 605, processed HTML text and images are displayed in a specified region with dimensions specified in file default.xtd.

In the first embodiment, the customized web browser accesses functional programs of the user's minimized web browser such as for processing HTML and displaying processed HTML text and images. For example where the user's web browser is Microsoft Internet Explorer 4.0, the executable x2client.exe accesses dynamically linked library (*.dll) files URLMON.DLL, SHLAPI.DLL, WININET.DLL, SHDOCVW.DLL, VBSCRIPT.DLL, MSHTML.DLL.

Figure 7:
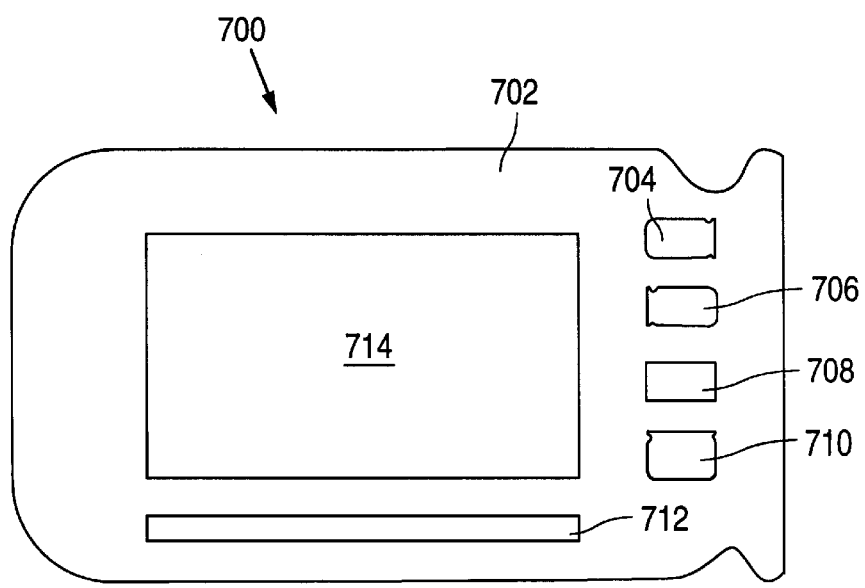
FIG. 7 depicts an example of a customized web browser 700 in accordance with the first embodiment of the present invention.

FIG. 7 depicts a possible appearance of the customized web browser 700 with a background image 702 shaped as a soda can, with buttons including forward 704, reverse 706, refresh 708, and home 710, URL entry position 712, and a region 714 where HTML will be displayed.

The customized web browser may be altered to present a changing background or pictures. For example, a web browser may depict flames which ripple. With the addition of plug-ins such as Real Audio, an audio-visual multimedia experience through the internet can be enhanced by tailoring the customized web browser to alter in conjunction with music and/or events in video streams.

The customized web browser may have more functionality than a conventional web browser. For example, the customized browser may include special functionality specific to a user's intranet.

Figure 8:
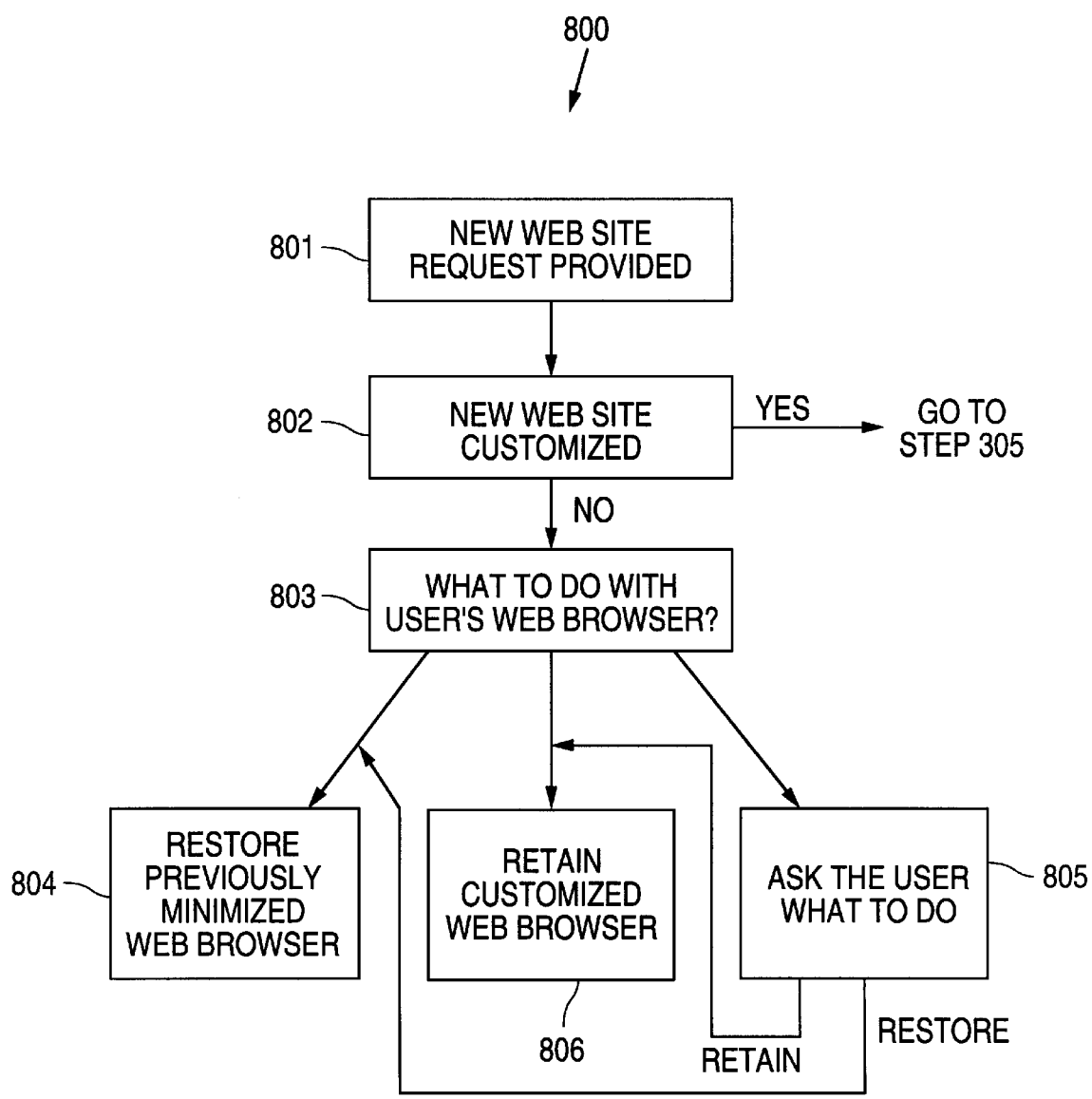
FIG. 8 depicts a flow chart diagram 800 showing the operation of the user's personal computer where a subsequent URL location is entered.

FIG. 8 depicts the operation of the user's personal computer 100 where the URL of a subsequent web page location is entered. In step 801, a URL request is placed over the internet using the desired data transfer protocol such as file transfer protocol (FTP) or hyper text transfer protocol (HTTP). In step 802, the user's personal computer 100 reads the downloaded web page code written for example in HTML and determines whether it is a customized web page in accordance with the first embodiment of the present invention. There are numerous methods to determine if the web page is customized. For example, if no ActiveX control language is included with the web page, then it is not a customized web page. If the web page includes the Microsoft Visual Basic script commands described with respect to FIG. 3, then the steps beginning at 305 of FIG. 3 are executed as discussed above. If the web page is not customized (e.g., because it does not reference the ActiveX object), in step 803 the options include retaining the customized web browser (step 806) for display of the non-customized web page, "restoring" the user's web browser in step 804 (previously minimized in step 601), or asking the user whether to "restore" the user's web browser (step 805). In data file default.xtc, described with respect to FIG. 6, statement POLICY specifies which step follows step 803, i.e., step 804, 805, or 806.

It will be apparent to those skilled in the art that there are a wide variety of techniques for implementing the first embodiment of the present invention. For example, Java Applets may be used rather than ActiveX controls. The coding in Microsoft Visual Basic Script can be done in Sun JavaScript.

The techniques described in the first embodiment of the present invention may also be used to modify any graphical user interface window.

In a second embodiment of the present invention, a editing tool program entitled x2edit is provided to allow a user to create customized web browser data files including default.xtc and default.xtd, described above, for use in creating a customized web browser described in the first embodiment. Source code written in Visual C++ 5.0 of an editing tool program, x2edit, for use on the user's personal computer 100 running Windows 95 operating system is included in Appendix D.

By using x2edit, a user can specify the appearance of background 702 (FIG. 7) of customized web browser 700, the region 714 where HTML will be displayed, the appearance and location of buttons 704–710, and the position of a URL entry position 712. The x2edit program also creates a graphics file representing an outline of background 702, file edge.pol, represented by lines which pass through all the outside edge pixels of background 702.

Program x2edit creates file default.xtc which includes the positions of background 702, buttons 704–710, and URL locator 712, as well as the names of the image files background 702 and buttons 704–710. Program x2edit also creates file default.xtd which includes the image files of background 702 and buttons 704–710. File default.xtd also includes information on the dimensions of area 714. In this embodiment the images of background 702 and buttons 704–710 are bitmap files which may be compressed using the JPEG convention.

Thereafter all the files necessary to display a customized web browser are available for use in the first embodiment of the present invention. In accordance with the first embodiment, a host server stores information relating to a customized web page with a customized web browser. A new directory on host server 150 is created called, for example, NEW. The data files including default.xtc and default.xtd are stored in the new directory. File config.xtl is updated to indicate a customized web site includes a customized web browser. Thereafter, access to the customized web page will cause the user's web browser to change appearance in accordance with the files created through use of the second embodiment of the present invention.

The foregoing description of the embodiments of the invention has been presented for purposes of illustration and description. It is not intended to be exhaustive or to limit the invention to the precise form disclosed. Numerous modifications or variations are possible in light of the above teachings. The embodiments were chosen and described to provide the best illustration of the principles of the invention and its practical application to thereby enable one of ordinary skill in the art to utilize the invention in various embodiments and with various modifications which are suited to the particular use contemplated.

What is claimed is:

1. A method for tailoring the appearance of a web browser window comprising:
    identifying a web browser whose window appearance, including boundary and incorporated browser buttons, is to be tailored;
    providing data that specifies the appearance of the web browser window; and
    tailoring the shape of the boundary of said web browser window and the location of the included control buttons of the web browser in accordance with the data such that said web browser window has a specified appearance.

2. The method of claim 1, wherein the step of identifying further comprises:

providing a web page address;

determining whether the web page addressed is identified as providing a tailored web window.

3. The method of claim 2, wherein the step of providing data further comprises:

when the web page addressed is identified as one that provides tailored, web browser window, providing said data.

4. The method of claim 1 wherein said data further specifies the location of a web page display region within the web browser window.

5. An apparatus for tailoring the appearance of a web browser window, comprising:

logic that identifies a web browser whose appearance including boundary and incorporated browser buttons, is to be tailored;

logic that provides data that specifies the appearance of the web browser window; and logic that tailors the shape of the boundary of said web browser window and the location of the included control buttons of the web browser in accordance with the data such that said web browser window has a specified appearance.

6. A method for transmitting a computer program that tailors the appearance of a web browser window, comprising:

receiving a request for a computer program tailoring the appearance including boundary and incorporated browser buttons, of the web browser; and supplying the requested computer program, wherein the computer program accesses data representing the boundary shape of the web browser window and the location of the included web browser control buttons and alters the web browser in accordance with said data.

7. The method of claim 6, wherein the data specifies a region for a web page to be displayed within the web browser.

8. An apparatus for transmitting a computer program that tailors the appearance of a web browser window, comprising:

logic that receives a request for a computer program tailoring the appearance, including boundary and incorporated browser buttons, of the web browser; and logic that supplies the requested computer program, wherein the computer program accesses data representing the boundary shape of the web browser window and the location of the included web browser control buttons and alters the web browser accordance with said data.

9. A computer program embodied on a computer-readable medium for altering the appearance and controls of a graphical user interface, comprising:

a code segment that identifies a web browser whose window appearance, including boundary and incorporated browser buttons, is to be tailored;

a code segment that provides data that specifies the appearance of the web browser window; and a code segment that tailors the shape of the boundary of said web browser window and the location of the included control buttons of the web browser in accordance with the data such that said web browser window has a specified appearance.

10. A method for providing information from a server to a client specifying the appearance of a tailored web browser interface window to be displayed at said client, comprising:

providing data that indicates the boundary shape of a web browser;

providing data that indicates the image and location of the included web browser control buttons;

providing a region to be altered based on said data for a web page to be displayed within the web browser interface window at the client.

11. An apparatus for providing information from a server to a client specifying the appearance of a tailored web browser interface window to be displayed at said client comprising:

means to produce logic that provides data that indicates the boundary shape of a web browser;

means to produce logic that provides data that indicates the image and location of the included web browser control buttons means to produce logic provides a location to be altered based on said data for a web page to be displayed within the web browser interface window at the client.

12. A computer program embodied on a computer-readable medium for allowing a user to provide information from a server to a client which specifies the appearance of a tailored web browser interface window to be displayed at said client, including a user selected shape of the boundary of he browser window, user selected image and location of the included controls buttons of the web browser, and a user selected region, to be altered based on said user selections, within the web browser window in which a web page is to be displayed at the client.

* * * * *